(12) United States Patent
Chang

(10) Patent No.: US 11,409,490 B2
(45) Date of Patent: Aug. 9, 2022

(54) MULTI-SCREEN CONTROL SYSTEM

(71) Applicant: Aten International Co., Ltd., New Taipei (TW)

(72) Inventor: Li-Jen Chang, New Taipei (TW)

(73) Assignee: Aten International Co., Ltd., New Taipei (TW)

(*) Notice: Subject to any disclaimer, the term of this patent is extended or adjusted under 35 U.S.C. 154(b) by 29 days.

(21) Appl. No.: 16/820,689

(22) Filed: Mar. 16, 2020

(65) Prior Publication Data

US 2021/0064321 A1    Mar. 4, 2021

(30) Foreign Application Priority Data

Aug. 27, 2019  (TW) ................................. 108130539

(51) Int. Cl.
*G06F 3/14*  (2006.01)

(52) U.S. Cl.
CPC .......... *G06F 3/1431* (2013.01); *G06F 3/1446* (2013.01)

(58) Field of Classification Search
CPC ...... G06F 3/1421; G06F 3/1446; G06F 3/147; H04N 5/06; H04N 5/147
See application file for complete search history.

(56) References Cited

U.S. PATENT DOCUMENTS

| | | | | |
|---|---|---|---|---|
| 5,434,625 | A * | 7/1995 | Willis | H04N 3/223 348/E7.003 |
| 8,330,733 | B2 | 12/2012 | Petschnigg et al. | |
| 8,457,466 | B1 * | 6/2013 | Sharma | H04N 5/247 386/224 |
| 10,509,616 | B2 * | 12/2019 | Kim | H04N 21/43079 |
| 10,635,375 | B2 * | 4/2020 | Sakuma | H04L 67/10 |
| 10,817,236 | B2 * | 10/2020 | Saeda | G06F 3/1239 |
| 10,965,937 | B2 * | 3/2021 | Holloway | H04N 21/4424 |
| 2002/0171668 | A1 * | 11/2002 | Samra | G11B 27/34 345/619 |

(Continued)

FOREIGN PATENT DOCUMENTS

| | | |
|---|---|---|
| CN | 103064646 | 4/2013 |
| CN | 103260006 | 8/2013 |

(Continued)

OTHER PUBLICATIONS

"Office Action of Taiwan Counterpart Application", dated Jun. 8, 2020, p. 1-p. 7.

*Primary Examiner* — William Lu
(74) *Attorney, Agent, or Firm* — JCIPRNET

(57) ABSTRACT

A multi-screen control system is provided. The multi-screen control system includes a plurality of display devices, at least one console device, a video switching device, and a centralized display device. The display device respectively shows output images provided by a plurality of video sources. The console device receives a control operation to the at least one of the output images. The video switching device is connected to the display device and the at least one console device. The video switching device transmits the output images provided by the video sources to the display device, and obtains at least one partial image from the at least one of the output images according to the control operation. The centralized display device is connected to the video switching device. The video switching device outputs the at least one partial image to the centralized display device.

15 Claims, 10 Drawing Sheets

(56) References Cited

U.S. PATENT DOCUMENTS

| | | | | |
|---|---|---|---|---|
| 2004/0015551 | A1* | 1/2004 | Thornton | G06F 3/1438 709/204 |
| 2005/0073578 | A1* | 4/2005 | Odlivak | G16H 15/00 348/65 |
| 2005/0097620 | A1* | 5/2005 | Fye | H04N 5/44591 725/118 |
| 2008/0094402 | A1* | 4/2008 | Bakalash | G06T 15/005 345/505 |
| 2008/0211825 | A1* | 9/2008 | Sunakawa | G06F 3/1446 345/581 |
| 2010/0238352 | A1* | 9/2010 | Dunn | H04N 21/41415 348/E9.057 |
| 2012/0182431 | A1* | 7/2012 | Asanov | A63F 13/335 348/207.1 |
| 2013/0223812 | A1* | 8/2013 | Rossi | H04N 5/772 386/224 |
| 2015/0054852 | A1* | 2/2015 | Ohnuma | G09G 5/14 345/635 |
| 2015/0195601 | A1* | 7/2015 | Hahm | H04N 21/43076 725/116 |
| 2015/0227196 | A1* | 8/2015 | Fujii | G06T 19/006 345/156 |
| 2015/0364159 | A1* | 12/2015 | Ushiyama | H04N 21/4668 386/230 |
| 2015/0370524 | A1* | 12/2015 | Minematsu | H04N 21/4122 345/501 |
| 2016/0088365 | A1* | 3/2016 | Yabu | G06V 20/46 725/32 |
| 2016/0178380 | A1* | 6/2016 | Iwaizumi | G01C 21/3682 701/409 |
| 2018/0289443 | A1* | 10/2018 | Wade | G16H 40/63 |

FOREIGN PATENT DOCUMENTS

| | | |
|---|---|---|
| CN | 104104903 | 10/2014 |
| TW | M240752 | 8/2004 |
| TW | 200735031 | 9/2007 |
| TW | I493404 | 7/2015 |
| TW | I658657 | 5/2019 |

* cited by examiner

MULTI-SCREEN CONTROL SYSTEM

CROSS-REFERENCE TO RELATED APPLICATION

This application claims the priority benefit of Taiwan application serial no. 108130539, filed on Aug. 27, 2019. The entirety of the above-mentioned patent application is hereby incorporated by reference herein and made a part of this specification.

BACKGROUND OF THE DISCLOSURE

Field of the Disclosure

The present disclosure relates to a display system, and in particular, to a multi-screen control system.

Description of Related Art

A multi-screen control system (e.g., a video wall) is a large display device spliced by a plurality of displays, and is commonly used in information centres, monitoring rooms and video conferences, or used as a large indoor and outdoor billboard. A traditional multi-screen control system may simultaneously display image content provided by a plurality of video sources, so that a user may simultaneously receive a large amount of image information through the multi-screen control system. However, the large amount of image information displayed simultaneously may cause difficulty for the user to obtain an image focus, that is, the user does not easily and accurately acquire key information actually needed from display images of the plurality of displays. On the other hand, in an application scenario where the multi-screen control system simultaneously displays a large number of images, the user may need to turn the head in the case of head-up to acquire image content provided by different displays. It can be seen that with the increase of the number of displays and display images in the multi-screen control system, the traditional multi-screen control system will make it difficult for the user to interpret image information, and also easily cause the user to suffer from the visual and physical muscle fatigues.

SUMMARY OF THE DISCLOSURE

In view of this, the present disclosure provides a multi-screen control system, which may integrate image focuses displayed by a plurality of screens in a centralized image to facilitate user viewing.

The present disclosure provides a multi-screen control system, which includes a plurality of display devices, at least one console device, a video switching device, and a centralized display device. The display device respectively shows output images provided by a plurality of video sources. The console device receives a control operation to the at least one of the output images. The video switching device is connected to the plurality of display devices and the at least one console device. The video switching device transmits the output images provided by the video sources to the plurality of display devices, and obtains at least one partial image from the at least one of the output images according to the control operation. The centralized display device is connected to the video switching device. The video switching device outputs the at least one partial image to the centralized display device such that the centralized display device displays a centralized image including the at least one partial image.

The present disclosure additionally provides a multi-screen control system, which includes a plurality of display devices, at least one console device, a plurality of first video receivers, a centralized display device, a network device, and a second video receiver. The display device displays output images provided by video sources. The console device receives a control operation to the at least one of the output images. The first video receivers are connected to the respective display devices, receive, through a network, the output images provided by the video sources, and transmit the output images provided by the video sources to the display devices. The network device is connected to the first video receivers. The second video receiver is connected to the centralized display device, the network device and the at least one console device, obtains at least one partial image of at least one of the output images via the network device according to the control operation, and outputs the at least one partial image to the centralized display device such that the centralized display device displays a centralized image including the at least one partial image.

Based on the above, in an embodiment of the present disclosure, partial images of a plurality of output images are integrated by a video switching device or a second video receiver. The multi-screen control system may display the partial images actually needed by a user on a centralized image of a centralized display in a centralized manner. The user may quickly acquire key information and reduce the viewing fatigue of the user.

In order to make the aforementioned and other objectives and advantages of the present disclosure comprehensible, embodiments accompanied with figures are described in detail below.

DESCRIPTION OF THE EMBODIMENTS

Figure 1:
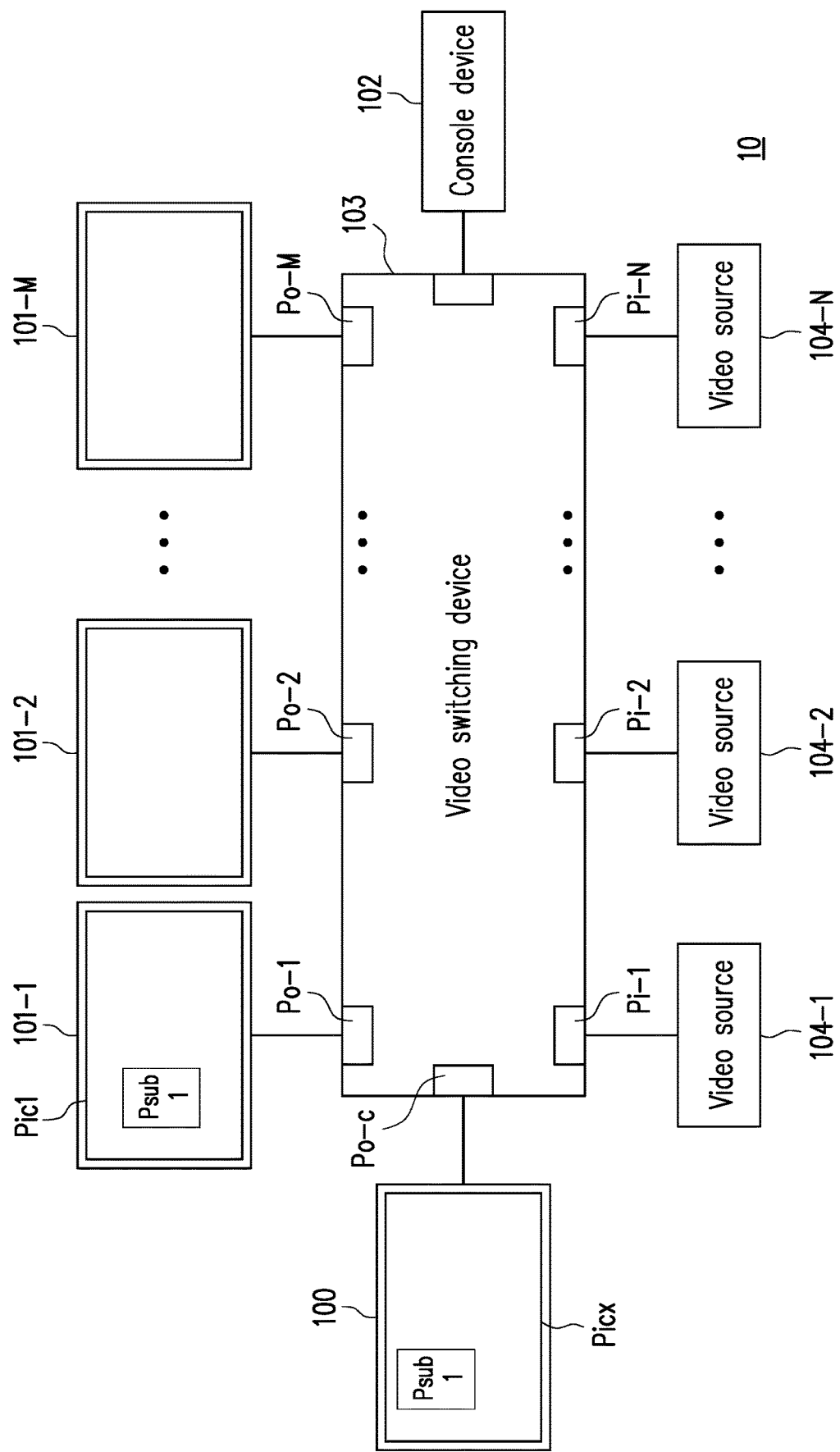
FIG. 1 is a schematic diagram of a multi-screen control system in accordance with an embodiment of the present disclosure.

Some embodiments of the present disclosure will be described in detail in the following in conjunction with the drawings. In reference numerals referenced in the following description, the same reference numerals in different drawings will represent the same or similar components. The embodiments are merely a part of the present disclosure and do not disclose all of the implementations of the present disclosure. Rather, these embodiments are merely examples of a method and a system within the scope of the patent application of the present disclosure.

Please refer to FIG. 1. FIG. 1 is a schematic diagram of a multi-screen control system 10 in accordance with an embodiment of the present disclosure. The multi-screen control system 10 includes M display devices 101-1 to 101-M, at least one console device 102, a video switching device 103, a centralized display device 100, and N video sources 104-1 to 104-N, where M and N are integers greater than 1.

The video switching device 103 has a plurality of video input ports Pi-1 to Pi-N and a plurality of video output ports Po-1 to Po-M. The display devices 101-1 to 101-M are connected to the video switching device 103 via M video output ports Po-1 to Po-M. The video sources 104-1 to 104-N are connected to the video switching device 103 via the video input ports Pi-1 to Pi-N. The video input ports Pi-1 to Pi-N and the video output ports Po-1 to Po-M are, for example, connecting ports that support HDMI transmission standard, but the present disclosure is not limited thereto. The display devices 101-1 to 101-M may be configured to display video content provided by some or all of the video sources 104-1 to 104-N. Specifically, the video switching device 103 is configured to transmit the video content provided by the video sources 104-1 to 104-N to the display devices 101-1 to 101-M, so that the display devices 101-1 to 101-M may display the video content provided by the video sources 104-1 to 104-N. For example, the display device 101-1 may be configured to display video content provided by the video source 104-1. Alternatively, the display devices 101-1 and 101-2 may be configured to jointly display the video content provided by the video source 104-1.

The display devices 101-1 to 101-M are, for example, liquid crystal displays (LCD), light-emitting diode (LED) displays, plasma displays, organic light emitting diode displays, or other types of display devices for displaying output images provided by the video sources 104-1 to 104-N. In one embodiment, the display devices 101-1 to 101-M may be arranged side by side to form a video wall.

The video sources 104-1 to 104-N are configured to provide the video content including the output images, and may be a computer host, a DVD player or a game machine, etc., and the present disclosure is not limited thereto.

The console device 102 is configured to receive a control operation issued by a user, which may be a mouse, a keyboard, a touchpad, a remote controller, etc., and the present disclosure is not limited thereto.

It is worth mentioning that in the present exemplary embodiment, the multi-screen control system 10 further includes a centralized display device 100. The centralized display device 100 is connected to the video switching device 103 via the video output port Po-c and is configured to display a centralized image. The centralized image may include a partial image of at least one of the output images displayed by the display devices 101-1 to 101-M. In other words, the video switching device 103 may integrate the partial images obtained from one or more output images displayed by the display devices 101-1 to 101-M to generate the centralized image, which will be described in more detail in the following embodiments.

The centralized display device 100 is, for example, a liquid crystal display (LCD), a light-emitting diode (LED) display, a plasma display, an organic light emitting diode display, or other types of display devices for displaying the centralized image generated by integrating at least one partial image by the video switching device 103.

Figure 2:
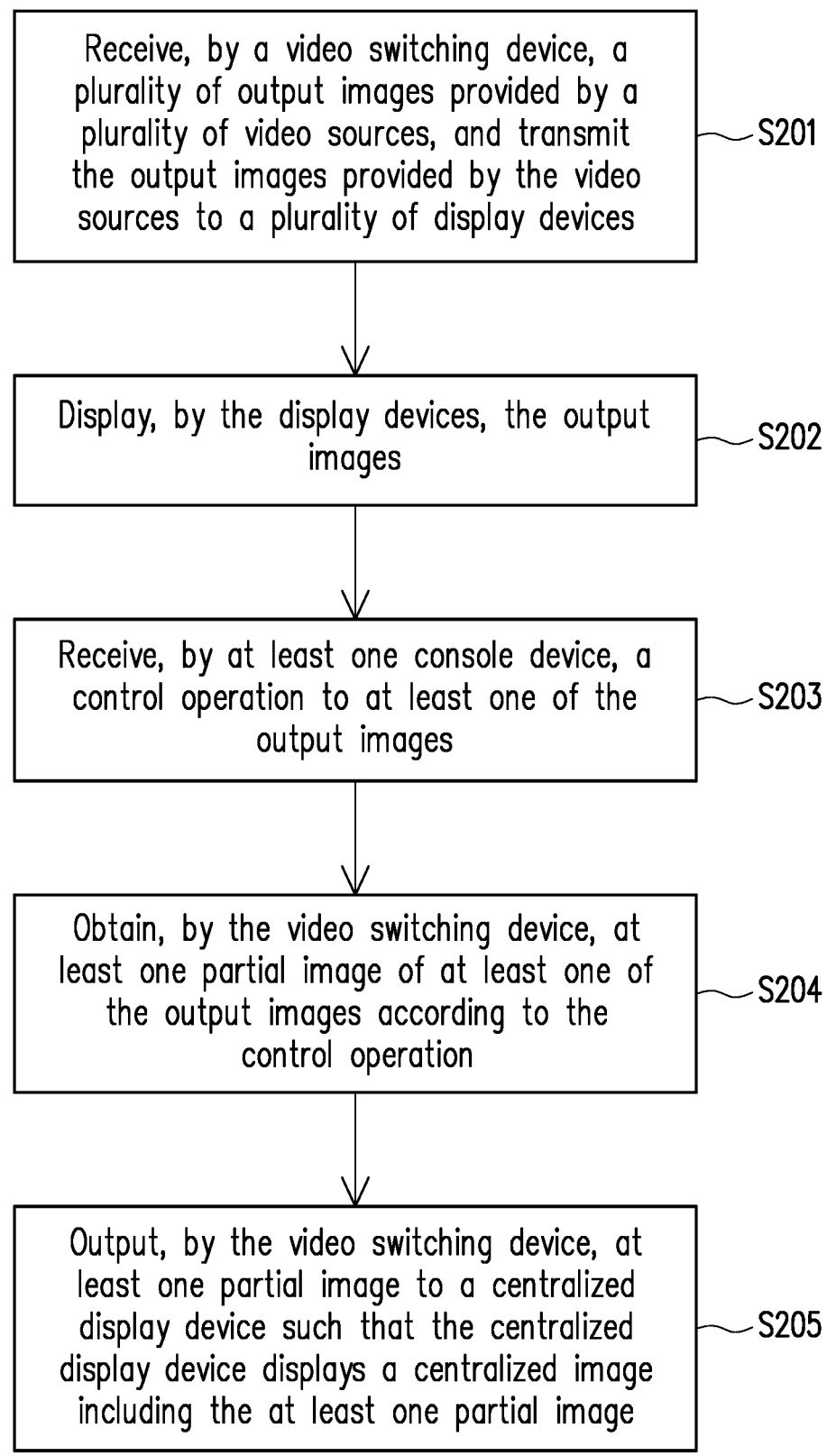
FIG. 2 is a flow chart of a multi-screen control method in accordance with an embodiment of the present disclosure.

Please refer to FIG. 2. FIG. 2 is a flow chart of a multi-screen control method in accordance with an embodiment of the present disclosure. The method of the present embodiment is applicable to the multi-screen control system 10 of FIG. 1. The detailed steps of the multi-screen control method of the present embodiment will be described below in conjunction with the multi-screen control system 10 and various members therein.

First, in step S201, a video switching device 103 receives a plurality of output images provided by a plurality of video sources 104-1 to 104-N, and transmits the output images provided by the video sources 104-1 to 104-N to a plurality of display devices 101-1 to 101-M. In step S202, the display devices 101-1 to 101-M display the output images. In other words, the video switching device 103 receives the output images provided by the plurality of video sources 104-1 to 104-N through video input ports Pi-1 to Pi-N, so that the display devices 101-1 to 101-M may receive the output images via the video input ports Po-1 to Po-N for display.

Next, in step S203, at least one console device 102 receives a control operation to at least one of the output images. In step S204, the video switching device 103 obtains at least one partial image of at least one of the output images according to the control operation. Specifically, a user may use the console device 102 to issue the control operation to at least one of the output images, such as, use the console device 102 to mark, circle, click, or define an image area of a partial image of interest such that the video switching device 103 may acquire coordinate information of the marked partial image. Therefore, the video switching device 103 may subsequently obtain image data of the partial image according to the coordinate information generated by the control operation. For example, when the display device 101-1 displays an output image Pic1 provided by the video source 104-1, the user may use the console device 102 to conduct a control operation to the output image Pic1 such that the video switching device 103 acquires, in response to the control operation, coordinate information of a partial image Psub1. Accordingly, the video switching device 103 may obtain the partial image Psub1 from the output image Pic1 according to the coordinate information of the partial image Psub1.

Finally, in step S205, the video switching device 103 outputs at least one partial image to a centralized display device 100 such that the centralized display device 100 displays a centralized image including the at least one partial image. For example, after the video switching device 103 obtains the partial image Psub1 of the output image Pic1 according to the coordinate information, the video switching device 103 may control the centralized display device 100 to display a centralized image Picx including the partial image Psub1. In other words, the video switching device 103 may integrate, after obtaining one or more partial images, the one or more partial images into a centralized image for display.

In order to clearly illustrate the present disclosure, the subsequent embodiments will be exemplarily described in the case where the multi-screen control system 10 includes four display devices 101-1 to 101-4. Of course, in view of different design concepts or user requirements, those of ordinary skill in the art may vary the number of display devices in the multi-screen control system 10 of the present disclosure to increase the application flexibility of the system.

Figure 3:
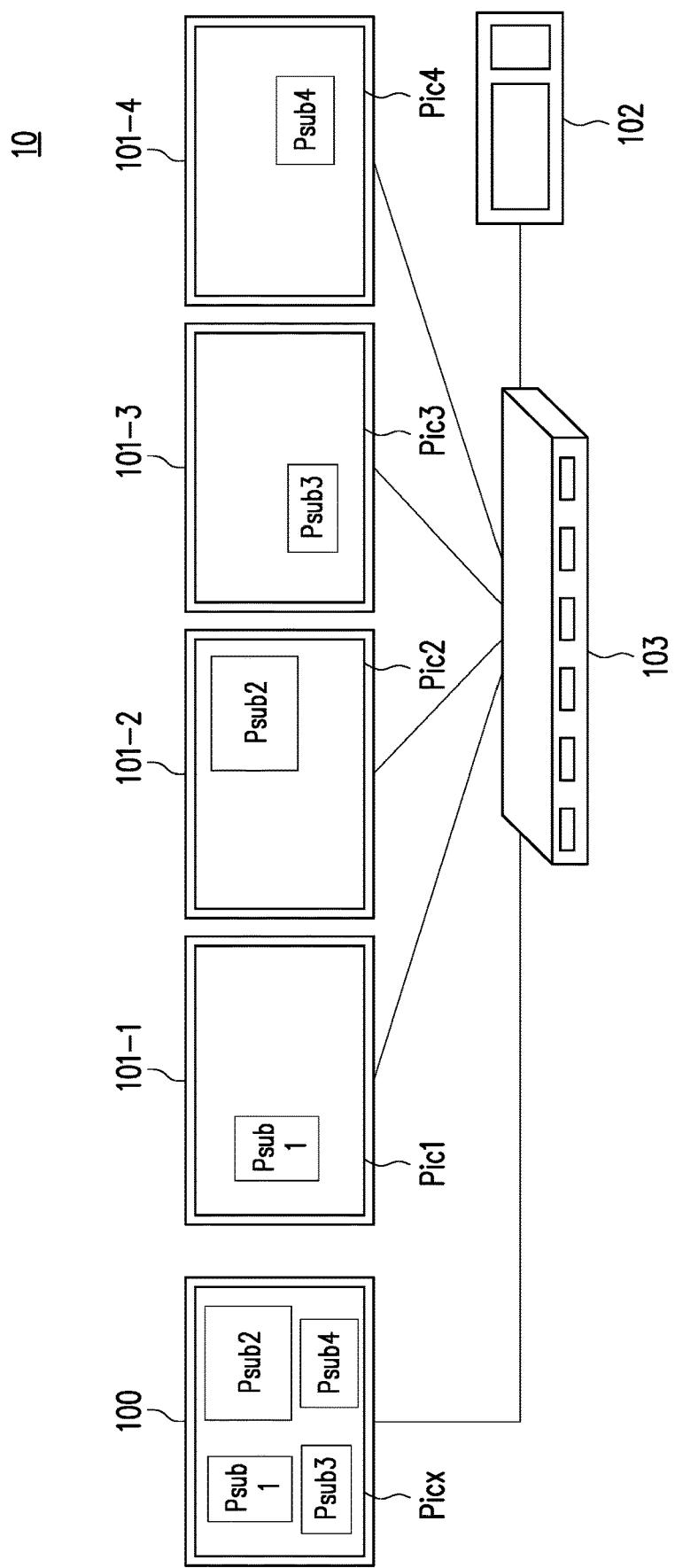
FIG. 3 is a schematic diagram of a scenario in accordance with an embodiment of the present disclosure.

FIG. 3 is a schematic diagram of a scenario in accordance with an embodiment of the present disclosure. Referring to FIG. 3, the display devices 101-1 to 101-4 may be configured to display output images Pic1 to Pic4, respectively. The user may use the console device 102 to conduct a control operation to the output images Pic1 to Pic4 to mark partial images Psub1 to Psub4 such that the video switching device 103 may obtain image area information (i.e., coordinate information of the partial images Psub1 to Psub4) corresponding to the partial images Psub1 to Psub4. Therefore, the video switching device 103 may obtain, according to the image area information, output images Pic1 to Pic4 provided by the video sources 104-1 to 104-N, thus integrating the obtained partial images Psub1 to Psub4 into a centralized image Picx to be provided to the centralized display device 100 for display.

Therefore, through the multi-screen control system 10 of the present disclosure, the user may simply obtain the partial images Psub1 to Psub4 through the console device 102, and generate the centralized image Picx through the video switching device 103 to display all the partial images Psub1 to Psub4 in an integrated manner. In this way, through the integration of the video switching device 103 in the multi-screen control system 10, the user may quickly browse or compare all the partial images Psub1 to Psub4 to be viewed on the centralized display device 100, so as to obtain an image focus and reduce visual burdens, thus reducing the probability of users misjudging based on images.

Figure 4:
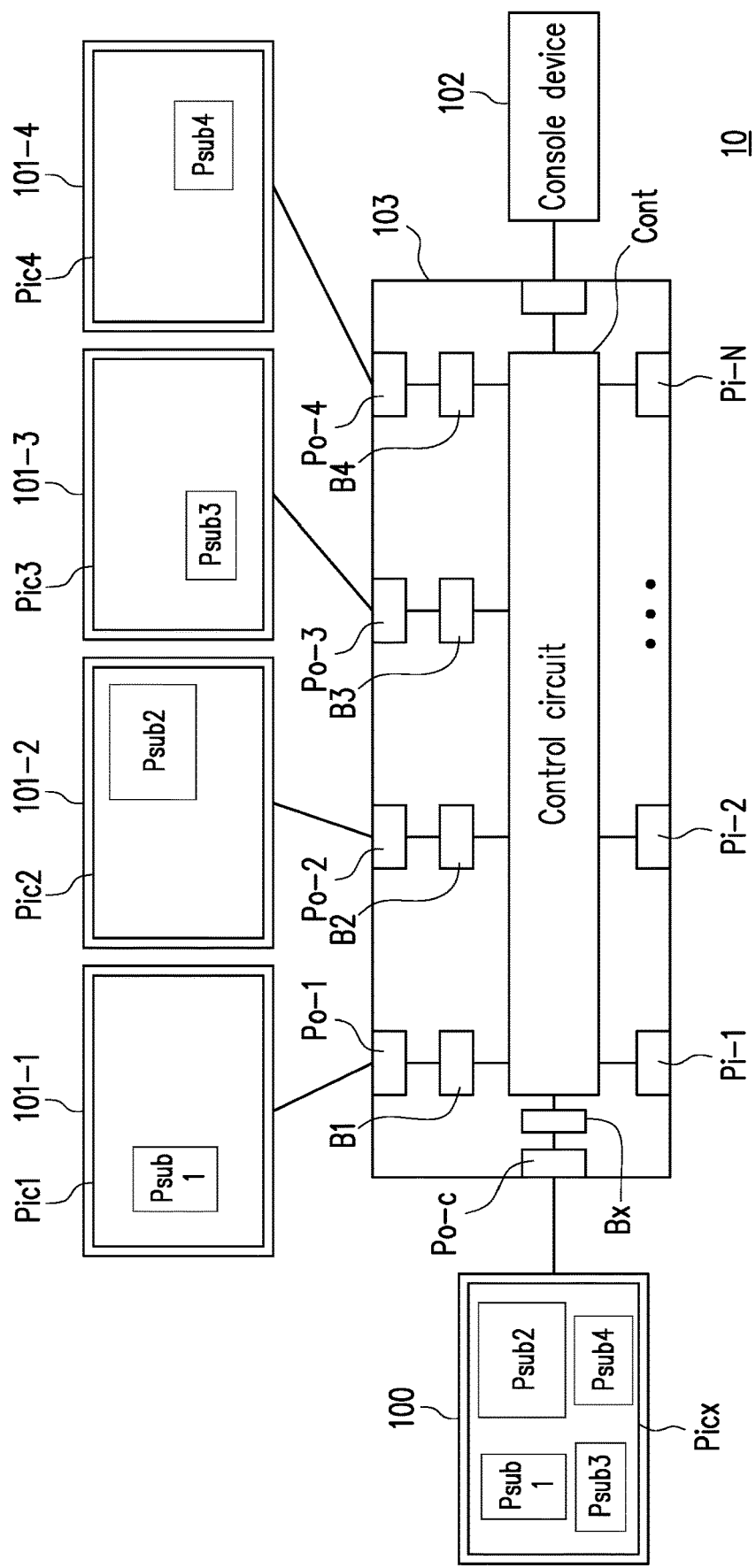
FIG. 4 is a schematic diagram of a video switching device in accordance with an embodiment of the present disclosure.

In order to illustrate the present disclosure more clearly, the embodiments are set forth below to clearly illustrate the possible implementations of the present disclosure. Please refer to FIG. 4. FIG. 4 is a schematic diagram of a video switching device in accordance with an embodiment of the present disclosure. In the present exemplary embodiment, in addition to the video input ports Pi-1 to Pi-N and the video output ports Po-1 to Po-4, the video switching device 103 may include a centralized image buffer Bx, image buffers B1 to B4, and a control circuit Cont. The image buffers B1 to B4 are respectively coupled between the control circuit Cont and the video output ports Po-1 to Po-N. The centralized image buffer Bx is coupled between the control circuit Cont and the video output port Po-c.

The centralized image buffer Bx and the image buffers B1 to B4 may be configured to store image data, and may be buffer memories, internal storage media, other types of storage devices, or a combination of the devices. For example, the centralized image buffer Bx and the image buffers B1 to B4 may be accomplished by dynamic random access memory (DRAM).

The control circuit Cont may write and read the centralized image buffer Bx and the image buffers B1 to B4, and the control circuit Cont may be a central processing unit (CPU), a microprocessor, a microcontroller, a digital signal processor (DSP), a field programmable gate array (FPGA), a programmable logic device (PLD), a programmable controller, an application specific integrated circuit (ASIC), or other similar processing devices, or a combination of the devices.

In detail, the video input ports Pi-1 to Pi-N receive output images from different video sources. The control circuit Cont may totally or selectively transmit video content from the video input ports Pi-1 to Pi-N to the image buffers B1 to B4 so that the display devices 101-1 to 101-4 mutually corresponding to the image buffers B1 to B4 may display the output images Pic1 to Pic4. For example, the control circuit Cont may transmit the video content from the video input port Pi-1 to the image buffer B1. The display device 101-1 mutually corresponding to the image buffer B1 may display the output image Pic1.

In addition, the control circuit Cont may also receive a control operation from the console device 102. In response to the control operation, the control circuit Cont of the video switching device 103 may record coordinate information of the partial images Psub1 to Psub4 according to a region defined by the control operation, and record the coordinate information in a lookup table.

Figure 5:
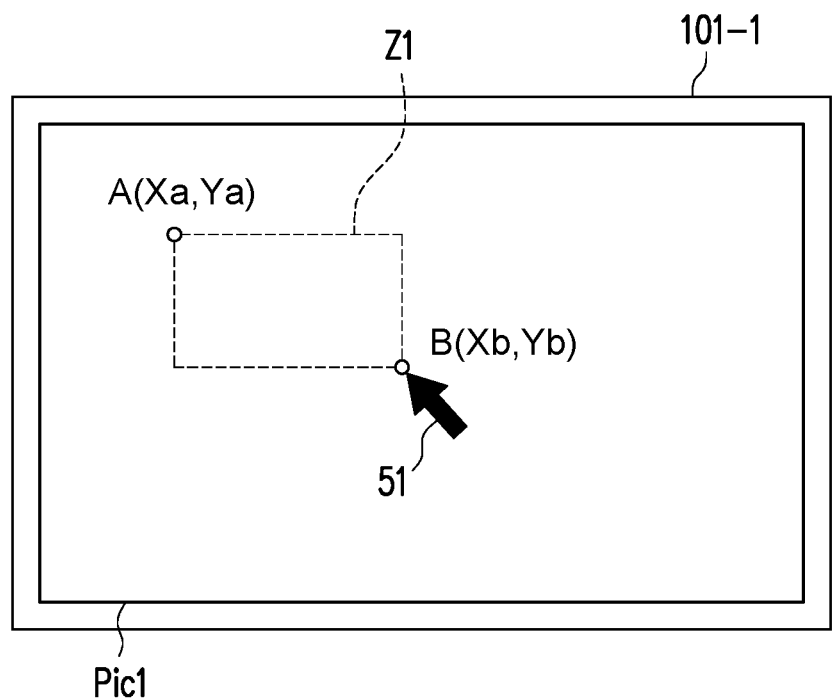
FIG. 5 is a schematic diagram of acquiring coordinate information of a partial image according to a control operation in accordance with an embodiment of the present disclosure.

For example, FIG. 5 is a schematic diagram of acquiring coordinate information of a partial image according to a control operation in accordance with an embodiment of the present disclosure. As shown in FIG. 5, when the user conducts a control operation to the output image Pic1 by using the console device 102, the display device 101-1 may display an on-screen display (OSD) thereon, the OSD may include graphical information such as a cursor 51. In other words, the control circuit Cont may additionally generate a layer of the OSD, and the display device 101-1 superimposes a layer of the output image Pic1 and the layer of the OSD. The user may move the cursor 51 by using the console device 102 to define an image area Z1 of the partial image Psub1, and the layer of the OSD will show a frame boundary of the cursor and the image area Z1.

In one embodiment, the user may click two diagonal vertices of the image area Z1 to be obtained through the console device 102 in the control operation, so that the control circuit Cont may acquire the coordinate information of the image area Z1, that is, a coordinate A (Xa, Ya) and a coordinate B (Xb, Yb). Alternatively, in one embodiment, the user may circle the image area Z1 by using a hot key function of the console device 102 during the control operation, thereby acquiring the coordinate information of the image area Z1 (i.e., a coordinate A (Xa, Ya) and a coordinate B (Xb, Yb)). Thereafter, the control circuit Cont may record the coordinate information of the image area Z1.

It is to be noted that in the process of acquiring the coordinate information of a partial image, FIG. 5 is an illustration with an example in which the display device 101-1 displays the output image Pic1 and the layer of the OSD. However, in another embodiment, the output image Pic1 and the layer of the OSD may be displayed by the centralized display device 100 such that the control circuit Cont may also acquire the coordinate information of an image obtaining area of the output image Pic1 according to the control operation. In addition, the user may repeatedly perform control operations to different output images such that the control circuit Cont may acquire a plurality of sets of coordinate information associated with a plurality of partial images.

Referring to FIG. 4 again, after recording the coordinate information of the image obtaining area of the partial images Psub1 to Psub4, the control circuit Cont may obtain the partial images Psub1 to Psub4 from the image buffers B1 to B4 according to the coordinate information, and may transmit the partial images Psub1 to Psub4 to the centralized image buffer Bx. In other words, the centralized image buffer Bx will record the image content of the partial images Psub1 to Psub4. In this way, the centralized display device 100 corresponding to the centralized image buffer Bx may display the centralized image Picx including the partial images Psub1 to Psub4.

Figure 6:
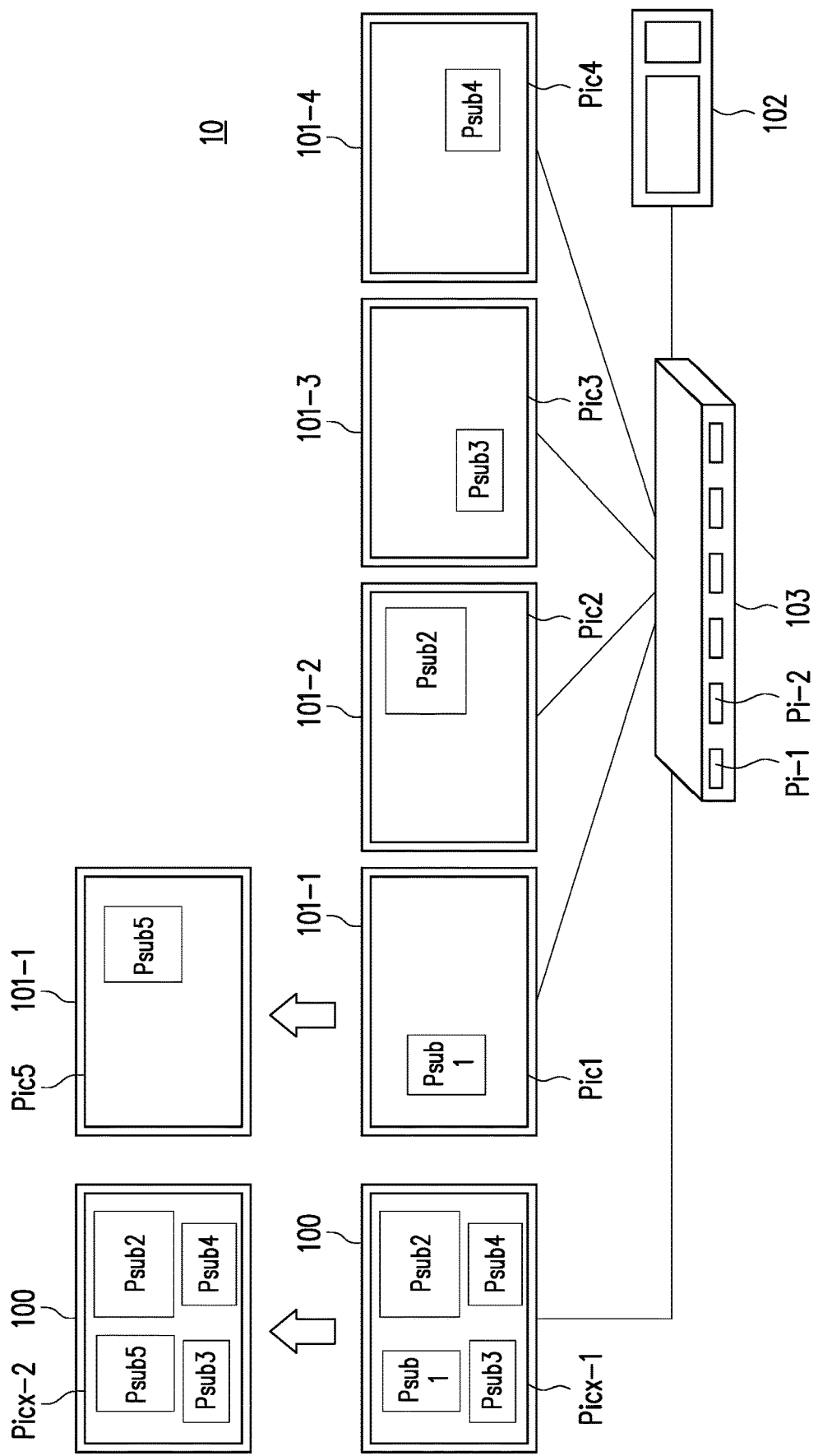
FIG. 6 is a schematic diagram of a multi-screen control system performing a switching operation in accordance with an embodiment of the present disclosure.

It is to be noted that in one embodiment, the video switching device 103 may switch image sources of one of the display devices 101-1 to 101-4 according to a switching operation conducted by the user. In this case, the display content of the centralized image may also be changed correspondingly. FIG. 6 is a schematic diagram of a multi-screen control system 10 performing a switching operation in accordance with an embodiment of the present disclosure. Referring to FIG. 6, when the video switching device 103 switches the image source of the display device 101-1 from the video input port Pi-1 to the video input port Pi-2, the display device 101-1 switches displaying the output image Pic1 corresponding to the video input port 104-1 to displaying an output image Pic5 corresponding to the video input port Pi-2, and the centralized display device 100 switches displaying the partial image Psub1 of the output image Pic1 to displaying a partial image Psub5 of the output image Pic5.

In detail, when the video switching device 103 switches the image source of the display device 101-1, the display device 101-1 switches to displaying the output image Pic5 from the video input port Pi-2. Therefore, the partial image Psub5 is transmitted to the centralized image buffer Bx to replace the partial image Psub1, so that the centralized display device 100 may switch from displaying a centralized image Picx-1 including the partial image Psub1 to displaying a centralized image Picx-2 including the partial image Psub5. Therefore, the multi-screen control system 10 of the present disclosure may switch the display content of the centralized display device 100 simultaneously when switching display sources corresponding to the display devices 101-1 to 101-4 through the switching operation to facilitate user viewing.

Figure 7:
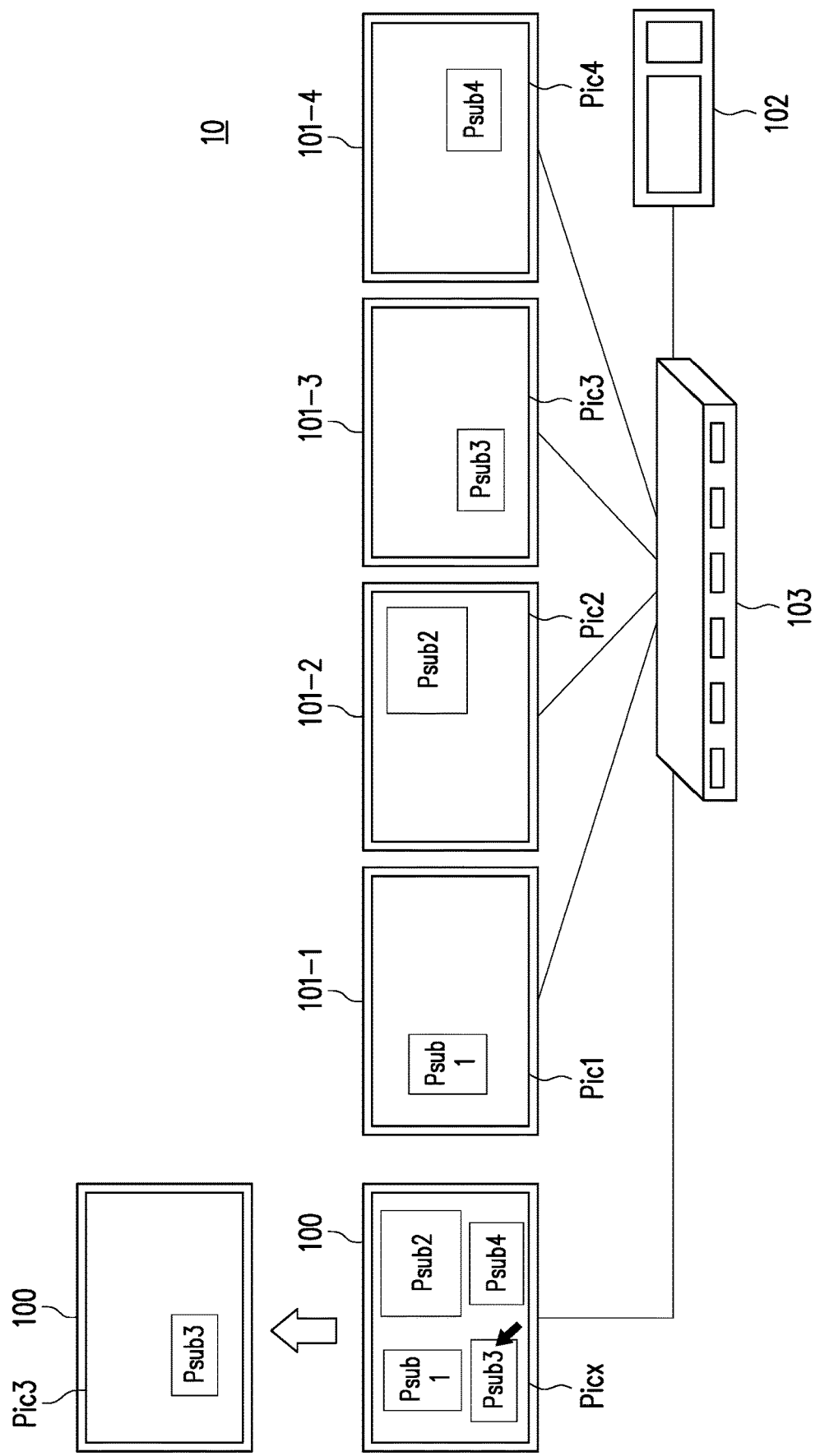
FIG. 7 is a schematic diagram of a multi-screen control system performing a selection operation in accordance with an embodiment of the present disclosure.

It is to be noted that in one embodiment, when the user issues a selection operation to the partial image of the centralized image, the centralized image may be switched to an output image corresponding to the selected partial image. FIG. 7 is a schematic diagram of a multi-screen control system 10 performing a selection operation in accordance with an embodiment of the present disclosure. As shown in FIG. 7, the display devices 101-1 to 101-4 in the multi-screen control system 10 respectively display the output images Pic1 to Pic4, and the output images Pic1 to Pic4 respectively include the partial images Psub1 to Psub4. When the video switching device 103 receives a selection operation instruction to be applied to the centralized image Picx by the user through the console device 120 for selecting the partial image Psub3, the centralized display device 100 switches displaying the centralized image Picx to displaying one of the output images (i.e., the output image Pic3) including the partial image Psub3. Therefore, the multi-screen control system 10 of the present disclosure may allow the user to switch the display content of the centralized display device at any time through the selection operation to facilitate user viewing.

Figure 8:
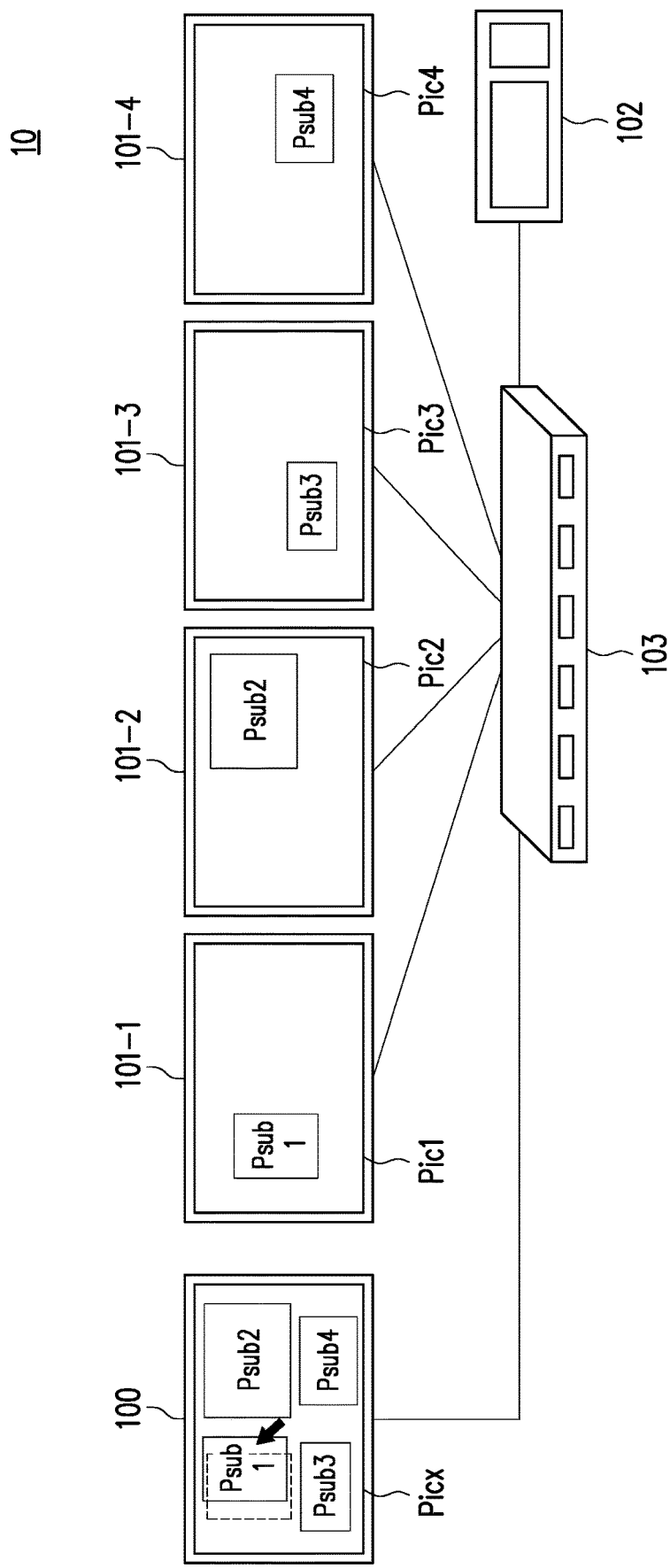
FIG. 8 is a schematic diagram of a multi-screen control system performing a movement operation in accordance with an embodiment of the present disclosure.

It is to be noted that in one embodiment, when the user issues a movement operation to the partial image of the centralized image, the location of the partial image applied with the movement operation in the centralized image may be correspondingly changed. FIG. 8 is a schematic diagram of a multi-screen control system 10 performing a movement operation in accordance with an embodiment of the present disclosure. As shown in FIG. 8, the display devices 101-1 to 101-4 in the multi-screen control system 10 respectively display the output images Pic1 to Pic4, and the output images Pic1 to Pic4 respectively include the partial images Psub1 to Psub4. When the video switching device 103 receives a movement operation instruction to be applied to the centralized image Picx by the user through the console device 120 for moving the partial image Psub1, the video switching device 103 changes a display position of the partial image Psub1 in the centralized image Picx. For example, by using the console device 102 the user performs a movement operation such as clicking and dragging on the partial image Psub1 to be moved in the centralized image Picx. In response to the selection operation of the user, the video switching device 103 adjusts the position of the partial image Psub1 in the centralized image Picx, and moves the partial image Psub1 to a position specified by the user according to the operation of the user from an original position (marked by a dotted line) of the partial image Psub1. Therefore, the user may easily change the display positions of the partial images Psub1 to Psub4 in the centralized image Picx through the movement operation, or adjust the overall layout in the centralized image Picx to facilitate user viewing.

It is to be noted that in the foregoing embodiment, the function of integrated displaying of partial images of a video wall is performed by a video and audio switching device. However, in other embodiments of the present disclosure, the function of integrated displaying of the partial images of the video wall may performed by a video extension device (including a video receiver and a video transmitter). The embodiments are set forth below for clear illustration.

Figure 9:
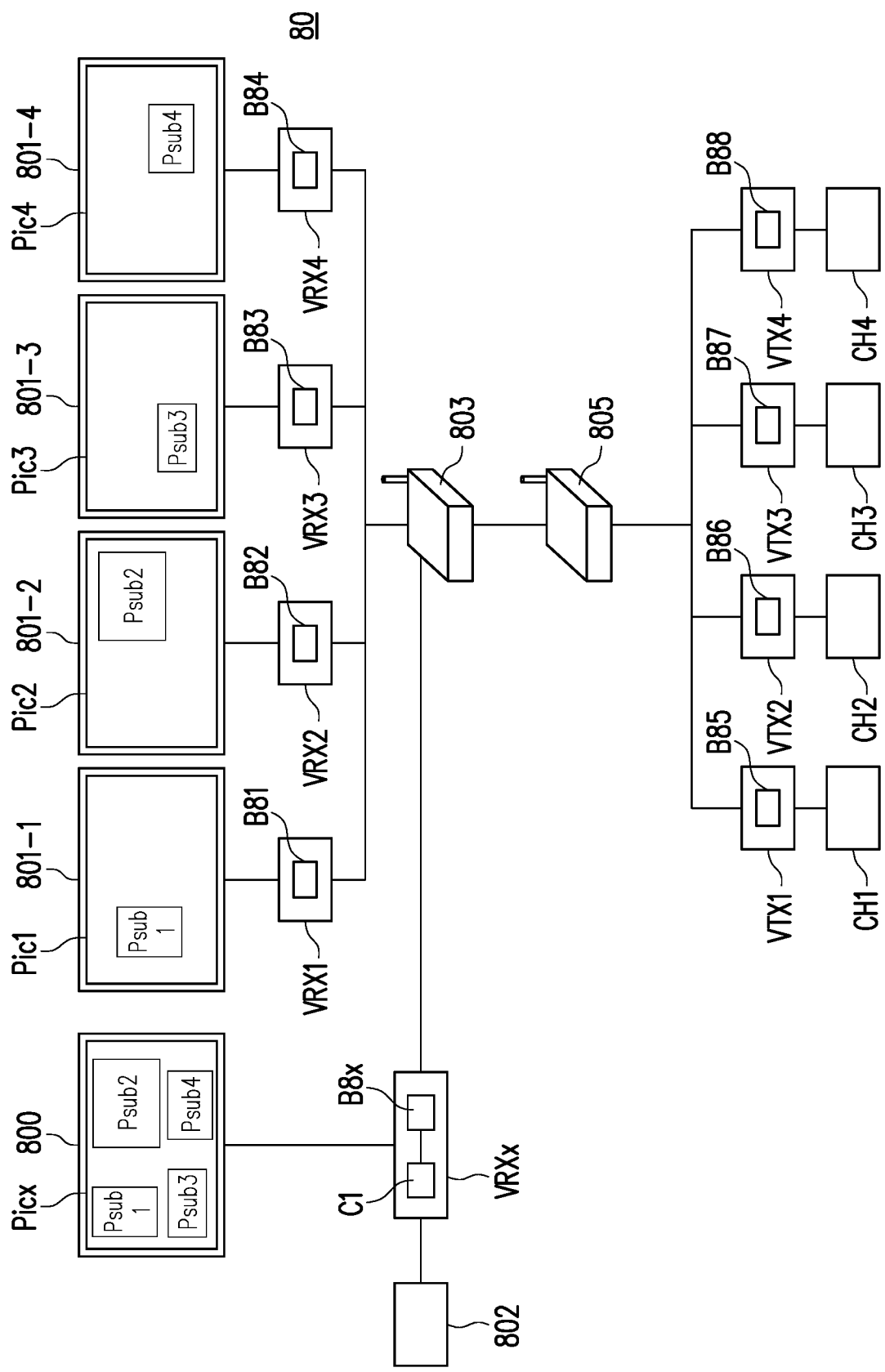
FIG. 9 is a schematic diagram of a multi-screen control system in accordance with an embodiment of the present disclosure.

Please refer to FIG. 9. FIG. 9 is a schematic diagram of a multi-screen control system 80 in accordance with an embodiment of the present disclosure. As shown in FIG. 9, the multi-screen control system 80 includes a centralized display device 800, a plurality of display devices 801-1, 801-2, 801-3, and 801-4, a console device 802, network devices 803 and 805, a plurality of first video receivers VRX1 to VRX4, a second video receiver VRXx, a plurality of video transmitters VTX1 to VTX4, and a plurality of video sources CH1 to CH4. It is to be noted that FIG. 9 is an illustration with an example of four display devices 801-1, 801-2, 801-3, and 801-4, four first video receivers VRX1 to VRX4, and four video transmitters VTX1 to VTX4. However, the present disclosure is not limited thereto. In view of different design concepts or user requirements, those of ordinary skill in the art may vary the number of video receivers and video transmitters to increase the application elasticity of the system.

The console device 802 is similar in function to the console device 102 of the foregoing embodiment, the centralized display device 800 and the display devices 801-1 to 801-4 are similar in function to the centralized display device 100 and the display devices 101-1 to 101-4 of the foregoing embodiment, and the descriptions thereof are omitted herein. It is to be noted that in the present embodiment, the display devices 801-1 to 801-4 are respectively connected to video output ports of the first video receivers VRX1 to VRX4 for display according to video content from the first video receivers VRX1 to VRX4. The centralized display device 800 is connected to a video output port of the second video receiver VRXx for display according to video content from the second video receiver VRXx.

The network devices 803 and 805 may be networking devices such as network switches. The first video receivers VRX1 to VRX4 and the second video receiver VRXx may be connected to the network device 803 via a network cable (e.g., a CAT-5 twisted pair cable). The video transmitters VTX1 to VTX4 may be connected to the network device 805 via the network cable. The network device 803 and the network device 805 may be connected via an Ethernet network.

The video sources CH1 to CH4 respectively transmit video content to the first video receivers VRX1 to VRX4 through the video transmitters VTX1 to VTX4. The first video receivers VRX1 to VRX4 may respectively receive the output images provided by the video sources CH1 to CH4 through the network devices 803 and 805 to display the display images Pic1 to Pic4 thereon. For example, the video content sent by the video transmitter VTX1 may be received by the first video receiver VRX1, so that the display device 801-1 displays the output image Pic1 provided by the video source CH1. The user may specify the transmission correspondence between the video transmitters VTX1 to VTX4 and the first video receivers VRX1 to VRX4 by setting identification codes on the video transmitters VTX1 to VTX4 and the first video receivers VRX1 to VRX4.

In addition, the second video receiver VRXx is connected to the centralized display device 800, the console device 802, and the network device 803, and may obtain the input images Pic1 to Pic4 according to the control operation received by the console device 802, thus integrating the obtained partial images Psub1 to Psub4 into the centralized image Picx displayed by the centralized display device 800.

As shown in FIG. 9, the first video receivers VRX1 to VRX4 each include image buffers B81 to B82. The image buffers B81 to B82 are respectively configured to temporarily store image data displayed by the display devices 801-1 to 801-4. The second video receiver VRXx includes a centralized image buffer B8$x$ and a control circuit C1. The centralized image buffer B8$x$ is configured to temporarily store image data displayed by the display device 800. The video transmitters VTX1 to VTX4 each include image buffers B85 to B88 for temporarily storing output images provided by the video sources CH1 to CH4.

Figure 10:
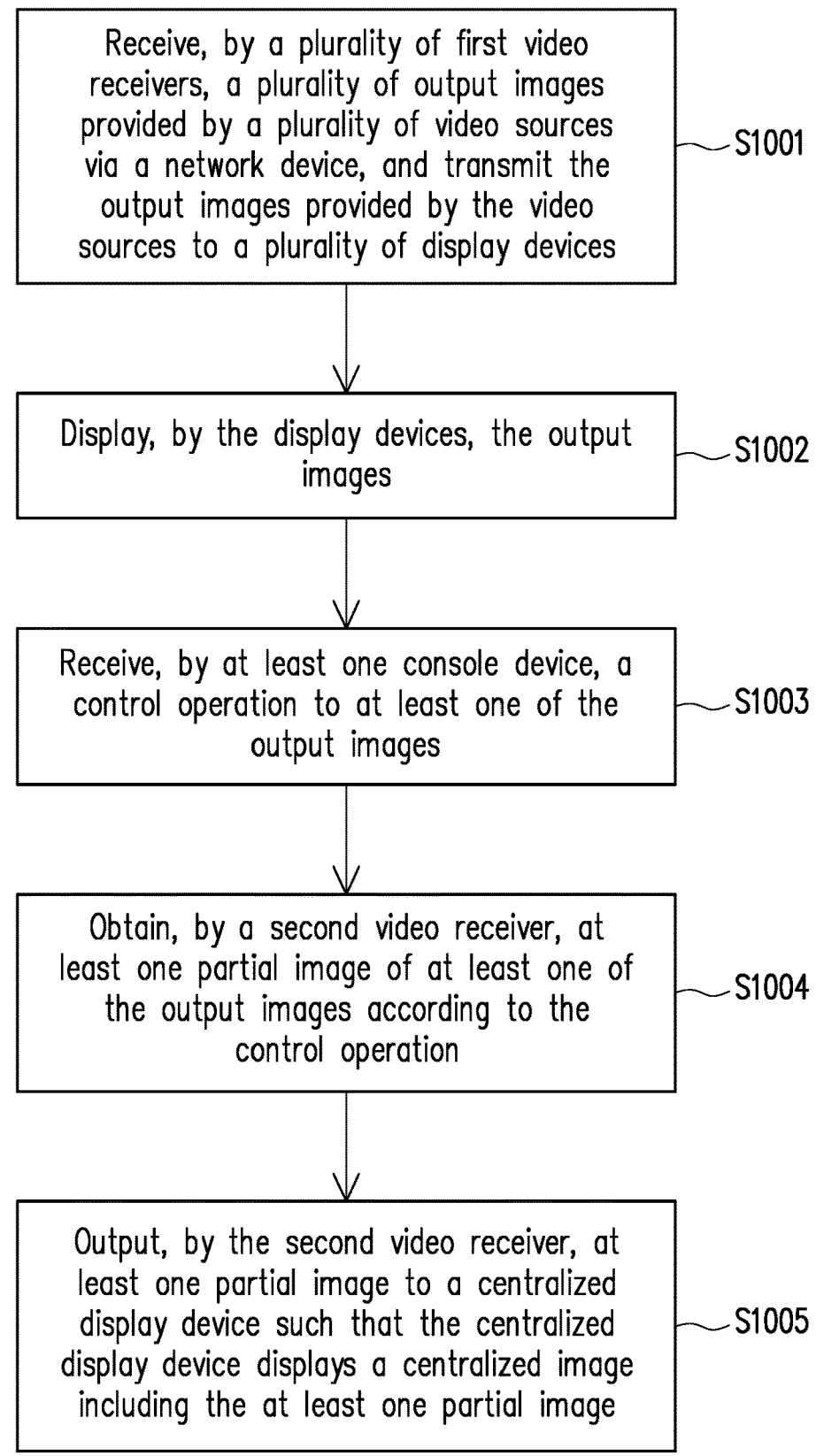
FIG. 10 is a flow chart of a multi-screen control method in accordance with an embodiment of the present disclosure.

Please refer to FIG. 10. FIG. 10 is a schematic diagram of a multi-screen control flow in accordance with an embodiment of the present disclosure. The method of the present embodiment is applicable to the multi-screen control system 80 of FIG. 8. The detailed steps of the multi-screen control flow of the present embodiment will be described below in conjunction with the multi-screen control system 80 and various members therein.

First, in step S1001, a plurality of first video receivers VRX1 to VRX4 receives a plurality of output images Pic1 to Pic4 provided by a plurality of video sources CH1 to CH4 via the network devices 803 and 805, and transmits the output images Pic1 to Pic4 provided by the video sources CH1 to CH4 to a plurality of display devices 801-1 to 801-4. In step S1002, the display devices 801-1 to 801-4 display the output images Pic1 to Pic4. That is to say, after the first video receivers VRX1 to VRX4 respectively receives the output images Pic1 to Pic4 from the video sources CH1 to CH4, the output images Pic1 to Pic4 may be respectively stored in image buffers B81 to B84 of the first video receivers VRX1 to VRX4.

In step S1003, at least one console device 802 receives a control operation of a user to at least one of the output images Pic1 to Pic4. In step S1004, the second video receiver VRXx obtains at least one partial image Psub1 to Psub4 of at least one of the output images Pic1 to Pic4 according to the control operation. When the user is intended to obtain a display area of the partial images Psub1 to Psub4, the user may perform the control operation by using the console device 802. In one embodiment, by setting the second video receiver VRXx, the centralized display device 800 may switch to alternately displaying the output images Pic1 to Pic4. When the centralized display device 800 displays the output image Pic1, the user may mark the partial image Psub1 through the console device 802. When the centralized display device 800 displays the output image Pic2, the user may mark the partial image Psub2 through the console device 802, and so on.

However, the specific implementation of acquiring the coordinate information of the partial image according to the control operation is clearly illustrated in FIG. 5, and the descriptions thereof are omitted herein. In other words, the control circuit C1 of the second video receiver VRXx may acquire coordinate information of the partial images Psub1 to Psub4 in response to the control operation issued by the user, and record the coordinate information of the partial images Psub1 to Psub4.

Therefore, in one embodiment, the control circuit C1 may respectively obtain at least one partial image Psub1 to Psub4 from the image buffers B81 to B84 of at least one of the first video receivers VRX1 to VRX4 according to the coordinate information of the partial images Psub1 to Psub4, and write the at least one partial image Psub1 to Psub4 into the centralized image buffer B8$x$ of the second video receiver VRXx. For example, the control circuit C1 may obtain at least one partial image Psub1 from the image buffer B81 of the first video receiver VRX1 according to the coordinate information of the partial image Psub1. It is to be noted that after the control circuit C1 obtains the partial images Psub1 to Psub4, the partial images Psub1 to Psub4 are not transmitted through a network channel between the network devices 803 and 805, so network bandwidths between the network devices 803 and 805 would not be occupied.

In another embodiment, the control circuit C1 may obtain at least one partial image Psub1 to Psub4 from image buffers B85 to B88 of at least one of the video transmitters VTX1 to VTX4, and write the at least one partial image Psub1 to Psub4 into the centralized image buffer B8$x$ of the second video receiver VRXx. For example, the control circuit C1 may obtain at least one partial image Psub1 from the image buffer B85 of the video transmitter VTX1 according to the coordinate information of the partial image Psub1.

Therefore, in step S1005, the second video receiver VRXx outputs at least one partial image Psub1 to Psub4 to the centralized display device 800 such that the centralized display device 800 displays a centralized image Picx including the at least one partial image Psub1 to Psub4.

Therefore, through the multi-screen control system 80 of the present disclosure, the user may simply obtain the partial images Psub1 to Psub4 through the console device 102. The centralized image Picx including the partial images Psub1 to Psub4 is generated through the second video receiver VRXx, and the partial images Psub1 to Psub4 of interest to the user may be displayed in an integrated manner. In this way, through the integration of the second video receiver VRXx in the multi-screen control system 80, the user may quickly browse or compare all the partial images Psub1 to Psub4 to be viewed, so as to obtain an image focus and reduce visual loading.

It is to be noted that the multi-screen control system 80 may perform a switching operation similar to that shown in FIG. 6, so that the partial images in the centralized image may be switched correspondingly in response to the change of the image sources of the display devices 801-1 to 801-4. For example, if the multi-screen control system 80 further includes a fifth video source (not shown) and a fifth video transmitter (not shown), in response to the image source of the display device 801-1 being switched to the fifth video transmitter, the partial image Psub1 in the centralized image Picx will be replaced with another partial image obtained from output images provided by the fifth video transmitter.

In one embodiment, the multi-screen control system 80 may perform a selection operation similar to that shown in FIG. 7, so that the partial image in the centralized image may be switched to a complete image including the selected partial image in response to the user selecting one of the partial images. For example, when the user clicks the partial image Psub3 on the OSD of the centralized display device 800 through the console device 802, the centralized display device 800 may switch from displaying the centralized image Picx to displaying the output image Pic3 including the partial image Psub3.

In one embodiment, the multi-screen control system 80 of the present disclosure may perform a movement operation similar to that shown in FIG. 8. In response to the console device 802 receiving a movement operation applied to the centralized image Picx and moving the partial image Psub1, the second video receiver VRXx changes a display position of the partial image Psub1 in the centralized image Picx. For example, the user performs an indication such as clicking and dragging on the partial image Psub1 to be moved in the centralized image Picx through the console device 802. The second video receiver VRXx adjusts the position of the partial image Psub1 in the centralized image Picx according to the operation of the user selectively moving the partial image Psub1.

Based on the above, in the embodiment of the present disclosure, the multi-screen control system may obtain a plurality of output images to display all obtained partial images in a centralized image in a centralized manner. In addition, an control operation of a user is received through a console device, and the user may conveniently change the arrangement of the centralized image and the configurations of the partial images. By integrating the image focuses of the user to be viewed in a single display region, the time of user searching in the multi-screen control system is saved, thereby improving user convenience. It can be seen that in an application scenario using a large video wall, the user may self-mark a partial image of interest and view the partial image selected by the user himself/herself through the centralized display device. Thus, the visual and physical muscle fatigues generated while the user viewing the large video wall may be alleviated, and key information actually needed may be quickly obtained.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A multi-screen control system, comprising:
    a plurality of display devices, configured to display a plurality of output images provided by a plurality of video sources;
    at least one console device, configured to receive a control operation performed to at least one of the output images by a user;
    a video switching device comprising a plurality of video input ports and a plurality of video output ports, connected to the plurality of display devices via the video output ports, connected to the plurality of video sources via the video input ports to receive the plurality of output images provided by the plurality of video sources, connected to the at least one console device, and configured to transmit the plurality of output images provided by the plurality of video sources to the plurality of display devices via the video output ports; and
    a centralized display device different from the plurality of the display devices, connected to the video switching device via another video output port of the video switching device,
    wherein after receiving the control operation performed on the at least one of the output images through the console device, the video switching device obtains coordinate information of at least one partial image according to a region defined by the control operation in the at least one of the output images, the coordinate information of at least one partial image comprises coordinates of vertices of the region defined by the control operation, the video switching device obtains the at least one partial image from the at least one of the plurality of output images provided by the video sources according to the coordinate information of at least one partial image, and the video switching device outputs the at least one partial image to the centralized display device via the another video output port, wherein the centralized display device only displays the at least one partial image obtained from the corresponding video source by the video switching device.

2. The multi-screen control system according to claim 1, wherein the video switching device comprises a plurality of image buffers respectively corresponding to the plurality of display devices and coupled between the control circuit and the video output ports, a centralized image buffer corresponding to the centralized display device, and a control circuit, the image buffers respectively corresponding to the plurality of display devices is coupled between the control circuit and the video output ports, the centralized image buffer is coupled between the control circuit and the another video output port, the control circuit obtaining the at least one partial image from at least one of the plurality of image buffers and writing the at least one partial image into the centralized image buffer.

3. The multi-screen control system according to claim 1, wherein the video switching device records the coordinate information of the at least one partial image, and obtains the at least one partial image from at least one image buffer according to the coordinate information.

4. The multi-screen control system according to claim 1, wherein the plurality of display devices comprise a first display device, the plurality of output images comprise a first output image and a second output image, when the video switching device switches a video source of the first display device from a first video input port to a second video input port, the first display device switches from displaying the first output image corresponding to the first video input port to displaying the second output image corresponding to the second video input port, and the centralized display device switches from displaying the at least one partial image of the first output image to displaying the at least one partial image of the second output image.

5. The multi-screen control system according to claim 1, wherein the at least one partial image comprises a first partial image and a second partial image, and the centralized display device displays the centralized image comprising the first partial image and the second partial image.

6. The multi-screen control system according to claim 5, wherein in response to the video switching device receiving, by the at least one console device, a selection operation applied to the centralized image and selecting the first partial image, the centralized display device switches from displaying the centralized image to displaying one of the plurality of output images comprising the first partial image.

7. The multi-screen control system according to claim 5, wherein in response to the video switching device receiving, by the at least one console device, a movement operation applied to the centralized image and moving the first partial image, the video switching device changes a display position of the first partial image in the centralized image.

8. The multi-screen control system according to claim 1, wherein the coordinate information of at least one partial image is acquired by using OSD (on-screen display).

9. A multi-screen control system, comprising:
a plurality of display devices, configured to display a plurality of output images provided by a plurality of video sources;
at least one console device, configured to receive a control operation performed to at least one of the plurality of output images by a user;
a plurality of first video receivers, respectively connected to the plurality of display devices, and configured to receive, through a network, the plurality of output images provided by the plurality of video sources, and transmit the plurality of output images provided by the plurality of video sources to the plurality of display devices;
a centralized display device different from the plurality of the display devices;
a network device, connected to the plurality of first video receivers; and
a second video receiver, connected to the centralized display device, the network device and the at least one console device, and configured to obtain coordinate information of at least one partial image according to a region defined by the control operation in the at least one of the output images after receiving the control operation performed on the at least one of the output images through the console device, wherein the coordinate information of at least one partial image comprises coordinates of vertices of the region defined by the control operation,
wherein the second video receiver obtains the at least one partial image from the at least one of the plurality of output images provided by the video sources according to the coordinate information of at least one partial image via the network device, and outputs the at least one partial image to the centralized display device, wherein the centralized display device only displays the at least one partial image obtained from the corresponding video source by the video switching device.

10. The multi-screen control system according to claim 9, wherein the plurality of first video receivers respectively comprise an image buffer corresponding to one of the plurality of display devices, the second video receiver comprises a centralized image buffer and a control circuit, and the control circuit obtains the at least one partial image from the image buffer of at least one of the plurality of first video receivers and writes the at least one partial image into the centralized image buffer.

11. The multi-screen control system according to claim 9, further comprising a plurality of video transmitters connected to the plurality of video sources, the plurality of video transmitters being connected to the plurality of first video receivers through the network device via a network,
wherein the second video receiver comprises a centralized image buffer and a control circuit, and the control circuit obtains the at least one partial image from an image buffer of at least one of the plurality of video transmitters and writes the at least one partial image into the centralized image buffer.

12. The multi-screen control system according to claim 9, wherein the second video receiver records coordinate information of the at least one partial image, and obtains the at least one partial image from at least one image buffer according to the coordinate information.

13. The multi-screen control system according to claim 9, wherein the at least one partial image comprises a first partial image and a second partial image, and the centralized display device displays the centralized image comprising the first partial image and the second partial image.

14. The multi-screen control system according to claim 13, wherein in response to the second video receiver receiving, by the at least one console device, a selection operation applied to the centralized image and selecting the first partial image, the centralized display device switches to displaying one of the plurality of output images comprising the first partial image.

15. The multi-screen control system according to claim 13, wherein in response to the second video receiver receiving, by the at least one console device, a movement operation applied to the centralized image and moving the first partial image, the second video receiver changes a display position of the first partial image in the centralized image.

* * * * *